(12) United States Patent
Van Der Bijl et al.

(10) Patent No.: US 10,588,254 B2
(45) Date of Patent: Mar. 17, 2020

(54) METHOD OF OPERATING AN AGRICULTURAL SYSTEM HAVING A TRACTOR AND AN IMPLEMENT, AN AGRICULTURAL SYSTEM, AND A COMPUTER PROGRAM PRODUCT

(71) Applicant: Kverneland Group Mechatronics B.V., Nieuw-Vennep (NL)

(72) Inventors: Martijn Van Der Bijl, Zonnemaire (NL); Peter Van Der Vlugt, Hoofddorp (NL)

(73) Assignee: Kverneland Group Mechatronics B.V., Nieuw-Vennep (NL)

( * ) Notice: Subject to any disclaimer, the term of this patent is extended or adjusted under 35 U.S.C. 154(b) by 45 days.

(21) Appl. No.: 16/075,800

(22) PCT Filed: Feb. 10, 2017

(86) PCT No.: PCT/EP2017/053022
§ 371 (c)(1),
(2) Date: Aug. 6, 2018

(87) PCT Pub. No.: WO2017/137571
PCT Pub. Date: Aug. 17, 2017

(65) Prior Publication Data
US 2019/0053418 A1 Feb. 21, 2019

(30) Foreign Application Priority Data
Feb. 12, 2016 (EP) ..................................... 16155472

(51) Int. Cl.
*A01B 76/00* (2006.01)
*A01B 59/06* (2006.01)
(Continued)

(52) U.S. Cl.
CPC .............. *A01B 76/00* (2013.01); *A01B 59/04* (2013.01); *A01B 59/06* (2013.01); *A01B 71/02* (2013.01); *G05B 15/02* (2013.01)

(58) Field of Classification Search
CPC ......... A01B 76/00; A01B 59/06; A01B 71/02; A01B 59/04
See application file for complete search history.

(56) References Cited

U.S. PATENT DOCUMENTS

| 5,918,195 A | 6/1999 | Halgrimson et al. |
| 2007/0246276 A1* | 10/2007 | Moszoro ................ A01B 76/00 180/65.31 |

(Continued)

FOREIGN PATENT DOCUMENTS

| EP | 1997686 A2 | 12/2008 |
| EP | 2821864 A1 | 1/2015 |

OTHER PUBLICATIONS

International Search Report and Written Opinion, completed Apr. 24, 2017, pertaining to PCT/EP2017/053022, filed Feb. 10, 2017.

*Primary Examiner* — Kira Nguyen
(74) *Attorney, Agent, or Firm* — Dinsmore & Shohl, LLP

(57) ABSTRACT

The invention refers to an agricultural system and a method of operating the system. An implement is connected to a tractor. A tractor control network (4) and an implement control network (5) are connected through a data bus (6). Control signals are transmitted over a signal line of the data bus (6). A driving power supply is provided by a tractor power supply (13) to a working unit (10*b*) of the implement through a driving power supply line, the tractor power supply (13) configured to provide a plurality of different driving voltages. Driving power supply control signals are received in the tractor control network (4), the driving power supply control signals being sent from the implement control network (5) over the signal line and indicating a present (Continued)

Figure 1:
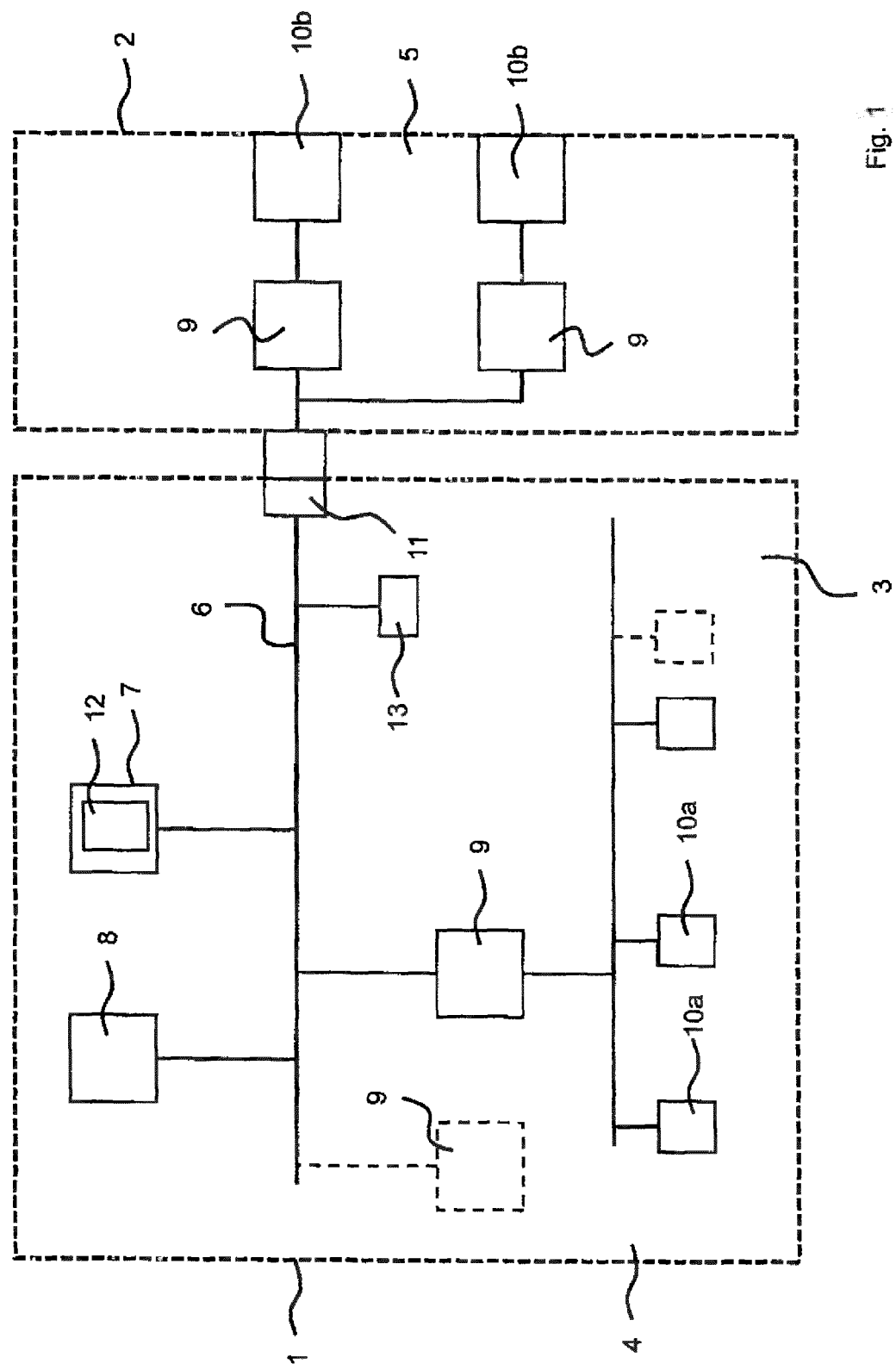

driving voltage. The present driving voltage is supplied over the driving power supply line to the working unit (10b).

20 Claims, 2 Drawing Sheets

(51) Int. Cl.
*A01B 71/02* (2006.01)
*A01B 59/04* (2006.01)
*G05B 15/02* (2006.01)

(56) References Cited

U.S. PATENT DOCUMENTS

2011/0090091 A1* 4/2011 Lerche ............... G01V 3/18
340/853.2
2014/0285000 A1* 9/2014 Vonroth ............. A01B 59/00
307/9.1

* cited by examiner

METHOD OF OPERATING AN AGRICULTURAL SYSTEM HAVING A TRACTOR AND AN IMPLEMENT, AN AGRICULTURAL SYSTEM, AND A COMPUTER PROGRAM PRODUCT

The invention refers to a method of operating an agricultural system having a tractor and an implement, an agricultural system, and a computer program product.

BACKGROUND

Increasingly, for agricultural machines electronic control of one or more functional elements of the agricultural machine is used.

A common standard, namely ISO 11783, was proposed for providing a network infrastructure for transmitting data signals between the various devices that may compose an agricultural machine. In addition to the transmission of control or data signals, the network infrastructure may be used for providing power supply to the various devices connected to the network infrastructure, e.g. from a tractor power supply to functional or working elements of an implemented connected to the tractor. While the control or data signals are transmitted over signal or data lines of the network structure which may also be referred to as communication lines, power supply may be applied over one or more power supply lines provided by the network infrastructure, such power supply line being established separately from the data lines used for a data or signal transmission.

With respect to the network infrastructure, a common data or control bus is provided to which different components of the agricultural system are connected. Through the data or signal bus data can be exchanged between the components connected to the bus. Among the components there may be a user terminal, and a plurality of electronic control units (ECU) each of which is assigned to a functional or working element of the agricultural machine or system, e.g. an implement connected to a tractor. The electronic control unit provides control signals to the functional element assigned to the respective electronic control unit for operating the functional or working element. Such functional element may refer to an element of a tractor or a functional element of an implement. In conclusion, the network infrastructure may provide for data communication within a tractor or between the tractor and an implement connected to the tractor.

According to a method of operation, user input is received through the user terminal. From the user input control signals are generated and transmitted to the electronic control units for controlling operation of the functional elements of the agricultural machine. It has been proposed to use auxiliary devices for controlling operation of the agricultural machine (see, EP 2 821 864 A1), e.g. a joystick or some other hardware element providing the option of receiving user input. Such auxiliary devices are used for controlling auxiliary functions of one or more functional elements of the agricultural machine. Through the user terminal input function of the auxiliary device can be mapped to control functions of the functional element of the agricultural device. For example, by moving a joystick functionally connected to the user terminal via the data bus, through the user terminal control signals are provided to the electronic control unit for which the control function is mapped to the joystick operation. Operation of the functional element assigned to the electronic control unit is controlled through a chain of operation from the joystick to the user terminal and finally to the functional element via the electronic control unit.

Document U.S. Pat. No. 5,918,195 discloses a method of generating a calibrated command signal in a control system including a command device. The command device, e.g., a control lever, is movable between pre-defined positions.

Document EP 1 997 686 A2 discloses a device for transmitting electrical energy from a tractor to an implement connected to the tractor. AC voltage is generated by a generator. Following, the AC voltage is transformed by a converter, thereby, providing a DC current. The DC current is provided to an intermediate DC voltage circuit of the tractor. There is a DC voltage of about 700 Volt. Converters are connected to the intermediate DC voltage circuit for transforming the DC current into AC current. An AC voltage in the range of about 400 V to 480 V is provided. The AC current is provided to a transformer transforming the AC voltage into an AC voltage from 200 V to 240 V. The converters connected to the intermediate DC voltage circuit are configured to provide different AC currents, for example, several AC currents having different frequencies. The different AC currents are applied to drive different functional elements of the implement.

SUMMARY

It is an object to provide a method of operating an agricultural system having a tractor and an implement, and an agricultural system for which adjustment to differing operational needs is improved.

According to one aspect, a method of operating an agricultural system having a tractor and an implement connected to the tractor according to claim 1 is provided. Also, an agricultural system and a computer program product according to claims 10 and 11, respectively, are provided. Alternative embodiments are disclosed in the dependent claims.

According to an aspect, a method of operating an agricultural system having a tractor and an implement connected to the tractor is provided. The method comprises hitching or connecting an implement to a tractor, and connecting a tractor control network and an implement control network through a data bus of an agricultural system control network comprising the tractor control network and the implement control network. The data bus of the agricultural system control network is configured to transmit at least data signals between elements, units or modules of the agricultural system comprising the tractor and the implement hitched to the tractor. Control signals are transmitted over one or more signal lines of the data bus between the tractor control network and the implement control network. A driving power supply is provided by a tractor power supply to a working unit or element of the implement connected to the implement control network over a driving power supply line of the data bus. The tractor power supply is configured to provide a plurality of different DC driving voltages. In the tractor control network driving power supply control signals are received, the driving power supply control signals being sent from the implement control network over the signal line and indicating a present DC driving voltage which is selected for driving the working unit and is one of the plurality of different DC driving voltages. The present driving voltage is supplied to the working unit over the driving power supply line. The working unit is operated by applying the present DC driving voltage.

According to another aspect, an agricultural system is provided. The agricultural system comprises a tractor, an implement functionally connected or hitched to the tractor, an agricultural system control network having a tractor control network and implement control network, and a data bus connecting the tractor control network and the implement control network. The agricultural system is configured to transmit control signals over a signal line of the data bus between the tractor control network and the implement control network; provide a driving power supply by a tractor power supply to a working unit of the implement connected to the implement control network over a driving power supply line of the data bus, the tractor power supply being configured to provide a plurality of different DC driving voltages; receive driving power supply control signals in the tractor control network, the driving power supply control signals being sent from the implement control network over the signal line and indicating a present DC driving voltage which is selected for driving the working unit and is one of the plurality of different DC driving voltages; supply the present DC driving voltage over the driving power supply line to the working unit; and operate the working unit by applying the present DC driving voltage.

According to still another aspect, a computer program product is provided.

The connecting of the tractor control network and the implement control network through the data bus may comprise connecting a connector comprised of a plug (male-ended) and a jack (female-ended). One or more power supply lines and one or more signal lines which may also be referred to as data communication lines may be provided with the data bus.

By the data or control bus and the components connected to it, an electronic control system of the agricultural system may be provided with a network infrastructure for transmitting data between components. Electronic control units coupled to the data bus may be assigned to one or more functional element of the agricultural machine. Due to the functional assignment the electronic control unit is configured to provide control signals to the functional element (working unit) for operating the functional element. The electronic control unit may be configured to receive operation signals from the function element which characterize the operation of the functional element.

In the electronic control system provided by the agricultural system control network, for data processing a processor connected to a memory element may be provided. The processor may be provided in a user terminal or outside of the user terminal, but functionally connected to an input device of the user terminal. The user terminal sometimes is referred to as virtual terminal of the electronic control system of the agricultural system. The user terminal may be configured to provide user access to normal or standard control functions with respect to functional components of the agricultural system, e.g. the functional or working components the implement.

The terminal display may be provided with an input device, e.g. a touch sensitive device and/or a mouse device. Through the user terminal and/or the additional user terminal, a user configuration input may be received.

Data or signal communication between some or all components of the agricultural system control network may be done at least in part by wireless communication. Wireless data communication may be combined with wired communication.

The receiving of the driving power supply control signals may further comprise: receiving connection signals in the implement control network, the connection signals indicating the connecting of the tractor control network and the implement control network through the data bus; and generating the driving power supply control signals by the implement control network in response to the receiving of the connection signals in the implement control network. The connecting of the tractor control network and the implement control network through the data bus may be detected in at least one of the tractor control network and the implement control network. If detection is done by the tractor control network, in response to the detection of the connecting, in the tractor control network data signals may be generated and transmitted to the implement control network, the data signals informing about the connecting of the tractor control network and the implement control network through the data bus.

The receiving of the driving power supply control signals may further comprise: receiving driving power supply information signals in the implement control network, the driving power supply information signals indicating the plurality of different DC driving voltages; and generating the driving power supply control signals by the implement control network in response to the receiving of the driving power supply information signals. The driving power supply information signals may be generated in the tractor control network. At least one of generating the driving power supply information signals and transmitting the driving power supply information signals by the tractor control network may be performed in response to connecting of the tractor control network and the implement control network through the data bus. The driving power supply information signals may be updated in the tractor control network during operation of the agricultural system, for example, for informing the implement control network about present power supply capability of the tractor power supply or current limitations of the tractor power supply. In response to such updating information, the driving voltage applied over the driving power supply line of the data bus may be switched to another driving voltage from the plurality of different DC driving voltages.

The receiving of the driving power supply control signals may further comprise: determining a present mode of operation for the working unit by the implement control network; determining the present driving voltage to be applied in the present mode of operation; and generating the driving power supply control signals by the implement control network in response to the determining of the present driving voltage. Different modes of operation for the working or functional unit may require for supplying different DC driving voltages. As an alternative, during a single mode of operation of the working unit at least two different DC driving voltages may be required for operation. Different DC driving voltages may be provided in the implement control network by applying a voltage divider dividing the driving voltage supplied by the tractor power supply locally in the implement. The implement control network may be configured to determine a driving voltage selected from the plurality of different DC driving voltages which is preferred to provide the several different DC driving voltages required for the present operation of the working unit. For example, a driving voltage may be selected from the plurality of different DC driving voltages which provides best for voltage division by the voltage divider in the implement.

The method may further comprise: determining one of a full-load operation mode and a part-load operation mode for the working unit by the implement control network; and determining the present driving voltage to be applied in at least one of the full-load operation mode and the part-load operation mode. The full-load operation mode may require for a higher driving voltage than the part-load operation mode.

The method may further comprise: providing at least one electronic control unit connected to the working unit in the implement control network; and providing a control unit operation power supply over an operation power supply line of the data bus separated from the driving power supply line by the tractor power supply to the at least one electronic control unit, the tractor power supply being configured to provide a control unit operation voltage over the operation power supply line. The control unit operation voltage may be a DC voltage.

The control unit operation voltage may be different from the plurality of different DC driving voltages. A control unit operation voltage may be different in terms of the voltage level compared to the plurality of different DC driving voltages. As an alternative, the control unit operation voltage may be equal to one of the different DC driving voltages.

The plurality of different DC driving voltages may be provided with a voltage level of not more than 60V.

The connecting of the tractor control network and the implement control network through the data bus may further comprise establishing an ISO bus connection between the tractor control network and the implement control network. The ISO bus standard may implement the ISO 11783 standard, preferably the ISO 11783-11 standard.

With regard to the agricultural system the alternative embodiments disclosed above may apply mutatis mutandis.

DESCRIPTION OF FURTHER EMBODIMENTS

Figure 2:
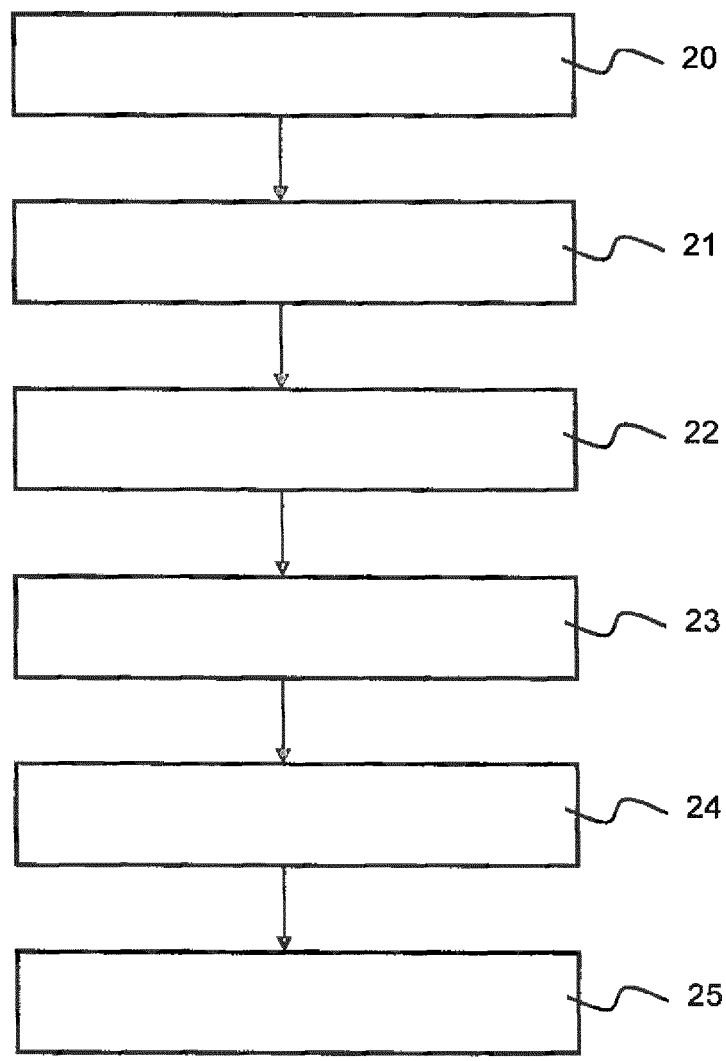

Following, further embodiments are described, by way of example, with reference to figures. In the drawings show:

FIG. 1 a schematic representation of an agricultural system comprising a tractor and an implemented connected to the tractor, and FIG. 2 a schematic representation of a block diagram with regard to a method of operating the agricultural system depicted in FIG. 1.

FIG. 1 shows a schematic representation of an agricultural system having a tractor 1 and an implement 2 hitched to the tractor 1.

An agricultural system control network 3 provides for an electronic control system of the agricultural system. The agricultural system control network 3 comprises a tractor control network 4 and an implement control network 5. The agricultural system control network 3 is having a data bus 6 to which a user terminal 7, a task controller 8, and a plurality of electronic control units 9 are connected. Each of the electronic control units 9 is assigned to a functional element 10a, 10b provided in the tractor 1 and the implement 2, respectively. With regard to the implement 2, the functional elements 10b may also be to as working or functional unit. Through the data bus 6 electronic data may be transmitted between the components, units, modules or elements connected to the data bus 6. The electronic control system of the agricultural system control network 3 may implement the ISO 11783 standard, preferably the ISO 11783-11 standard.

The data bus 6 is provided with a plug connector 11 connecting the tractor control network 4 and the implement control network 5.

The user or operator terminal 7 is provided with a terminal display 12 and provides for user control and user display. Further, the user terminal 7 is provided with a processor unit comprising a processor and a memory element connected to the processor. Multiple software applications implemented on the user terminal may be running simultaneously.

Through the user terminal 7 user input may be received for controlling the functional elements 10a, 10b of the agricultural machine or system. Also, through the terminal display 12 operation information may be displayed to the user.

FIG. 2 shows a schematic representation of a block diagram with regard to a method of operating the agricultural system depicted in FIG. 1. In step 20 the tractor 1 is connected the implement 2. Following, in step 21 the tractor control network 4 and the implement control network 5 are connected through the plug connector 11. Thereby, both the tractor control network 4 and the implement control network 5 are connected to the data bus 6. The data bus 6 comprises at least a signal line for transmitting control or data signals between the tractor control network 4 and the implement control network 5, and a driving power supply line for providing a plurality of different driving voltages from a tractor power supply 13 which may comprise a battery to the working or functional element 10b of the implement 2. The plurality of different driving voltages is provided as a plurality of different DC driving voltages, preferably with a DC voltage level of not more than 60V.

Control signals are transmitted over the signal line of the data bus 6 between the tractor control network 4 and the implement control network 5 (step 22).

In step 23, driving power supply control signals are received in the tractor control network 4. The driving power supply control signals are sent from the implement control network 5 over the signal line of the data bus 6 and are indicating a present driving voltage which is selected for driving one or more working elements 10b. The present driving voltage corresponds to one of the plurality of different driving voltages provided by the tractor power supply 13. In response to receiving the driving power control signals in the tractor control network 4, in step 24, the present driving voltage is supplied over the driving power supply line to the one or more working elements 10b. The one or more working elements 10b are operated by applying the present driving voltage in step 25.

The features disclosed in this specification, the figures and/or the claims may be material for the realization of the invention in its various embodiments, taken in isolation or in various combinations thereof.

The invention claimed is:

1. A method of operating an agricultural system having an implement connected to a tractor, the method comprising:
connecting a tractor control network and an implement control network through a data bus of an agricultural system control network comprising the tractor control network and the implement control network;
transmitting control signals over a signal line of the data bus between the tractor control network and the implement control network;
providing a driving power supply by a tractor power supply to a working unit of the implement, the working unit being connected to the implement control network through a driving power supply line, the tractor power supply being configured to provide a plurality of different DC driving voltages;
receiving driving power supply control signals in the tractor control network, the driving power supply control signals being sent from the implement control network over the signal line and indicating a present DC driving voltage which is selected for driving the working unit and is one of the plurality of different DC driving voltages;

supplying the present DC driving voltage over the driving power supply line to the working unit; and operating the working unit by applying the present DC driving voltage.

2. The method according to claim 1, wherein the receiving of the driving power supply control signals further comprises:

receiving connection signals in the implement control network, the connection signals indicating the connecting of the tractor control network and the implement control network through the data bus; and generating the driving power supply control signals by the implement control network in response to the receiving of the connection signals in the implement control network.

3. The method according to claim 2, wherein the receiving of the driving power supply control signals further comprises:

receiving driving power supply information signals in the implement control network, the driving power supply information signals indicating the plurality of different driving voltages; and generating the driving power supply control signals by the implement control network in response to the receiving of the driving power supply information signals.

4. The method according to claim 3, further comprising:

providing at least one electronic control unit connected to the working unit in the implement control network; and providing a control unit operation power supply over an operation power supply line separated from the driving power supply line by the tractor power supply to the at least one electronic control unit, the tractor power supply being configured to provide a control unit operation voltage over the operation power supply line.

5. The method according to claim 2, wherein the receiving of the driving power supply control signals further comprises:

determining a present mode of operation for the working unit by the implement control network;

determining the present DC driving voltage to be applied in the present mode of operation; and generating the driving power supply control signals by the implement control network in response to the determining of the present DC driving voltage.

6. The method according to claim 5, further comprising:

providing at least one electronic control unit connected to the working unit in the implement control network; and providing a control unit operation power supply over an operation power supply line separated from the driving power supply line by the tractor power supply to the at least one electronic control unit, the tractor power supply being configured to provide a control unit operation voltage over the operation power supply line.

7. The method according to claim 2, further comprising:

providing at least one electronic control unit connected to the working unit in the implement control network; and providing a control unit operation power supply over an operation power supply line separated from the driving power supply line by the tractor power supply to the at least one electronic control unit, the tractor power supply being configured to provide a control unit operation voltage over the operation power supply line.

8. The method according to claim 1, wherein the receiving of the driving power supply control signals further comprises:

receiving driving power supply information signals in the implement control network, the driving power supply information signals indicating the plurality of different driving voltages; and generating the driving power supply control signals by the implement control network in response to the receiving of the driving power supply information signals.

9. The method according to claim 8, wherein the receiving of the driving power supply control signals further comprises:

determining a present mode of operation for the working unit by the implement control network;

determining the present DC driving voltage to be applied in the present mode of operation; and generating the driving power supply control signals by the implement control network in response to the determining of the present DC driving voltage.

10. The method according to claim 9, further comprising:

providing at least one electronic control unit connected to the working unit in the implement control network; and providing a control unit operation power supply over an operation power supply line separated from the driving power supply line by the tractor power supply to the at least one electronic control unit, the tractor power supply being configured to provide a control unit operation voltage over the operation power supply line.

11. The method according to claim 1, wherein the receiving of the driving power supply control signals further comprises:

determining a present mode of operation for the working unit by the implement control network;

determining the present DC driving voltage to be applied in the present mode of operation; and generating the driving power supply control signals by the implement control network in response to the determining of the present DC driving voltage.

12. The method according to claim 11, further comprising:

determining one of a full-load operation mode and a part-load operation mode for the working unit by the implement control network; and determining the present DC driving voltage to be applied in at least one of the full-load operation mode and the part-load operation mode.

13. The method according to claim 12, further comprising:

providing at least one electronic control unit connected to the working unit in the implement control network; and providing a control unit operation power supply over an operation power supply line separated from the driving power supply line by the tractor power supply to the at least one electronic control unit, the tractor power supply being configured to provide a control unit operation voltage over the operation power supply line.

14. The method according to claim 13, further comprising:

receiving driving power supply information signals in the implement control network, the driving power supply information signals indicating the plurality of different driving voltages; and generating the driving power supply control signals by the implement control network in response to the receiving of the driving power supply information signals.

15. The method according to claim 1, further comprising:
providing at least one electronic control unit connected to the working unit in the implement control network; and
providing a control unit operation power supply over an operation power supply line separated from the driving power supply line by the tractor power supply to the at least one electronic control unit, the tractor power supply being configured to provide a control unit operation voltage over the operation power supply line.

16. The method according to claim 15, wherein the control unit operation voltage is different from the plurality of different DC driving voltages.

17. The method according to claim 1, further comprising providing the plurality of different DC driving voltages with a voltage level of not more than 60V.

18. The method according to claim 1, wherein the connecting of the tractor control network and the implement control network through the data bus further comprises establishing an ISOBUS connection between the tractor control network and the implement control network.

19. A computer program product stored on a storage medium and configured cause a processor to perform the method according to claim 1 during operation on an agricultural system that comprises a tractor, an implement functionally connected to the tractor, an agricultural system control network having a tractor control network and an implement control network, and a data bus connecting the tractor control network and the implement control network.

20. An agricultural system, comprising:
a tractor;
an implement functionally connected to the tractor;
an agricultural system control network having a tractor control network and an implement control network; and
a data bus connecting the tractor control network and the implement control network;
wherein the agricultural system is configured to:
transmit control signals through a signal line of the data bus between the tractor control network and the implement control network;
provide a driving power supply by a tractor power supply to a working unit of the implement connected to the implement control network over a driving power supply line, the tractor power supply being configured to provide a plurality of different DC driving voltages;
receive driving power supply control signals in the tractor control network, the driving power supply control signals being sent from the implement control network over the signal line and indicating a present DC driving voltage which is selected for driving the working unit and is one of the plurality of different driving voltages;
supply the present DC driving voltage over the driving power supply line to the working unit; and
operate the working unit by applying the present DC driving voltage.

* * * * *